(12) United States Patent
Ramamurthi

(10) Patent No.: US 7,383,546 B1
(45) Date of Patent: Jun. 3, 2008

(54) GLOBAL MANAGEMENT OF JOBS IN A HETEROGENEOUS SYSTEM

(75) Inventor: Subramaniam Ramamurthi, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 956 days.

(21) Appl. No.: 10/736,176

(22) Filed: Dec. 15, 2003

(51) Int. Cl.
*G06F 9/46* (2006.01)
*G06F 17/00* (2006.01)
*G06F 17/30* (2006.01)

(52) U.S. Cl. .......................... 718/100; 718/102; 707/8; 707/10

(58) Field of Classification Search ................... 707/10, 707/204, 8, 1, 205; 718/1–108
See application file for complete search history.

(56) References Cited

U.S. PATENT DOCUMENTS

| | | | | |
|---|---|---|---|---|
| 5,265,005 | A * | 11/1993 | Schmidt et al. | 700/18 |
| 6,026,403 | A * | 2/2000 | Siefert | 707/10 |
| 6,052,684 | A * | 4/2000 | Du | 707/8 |
| 6,078,982 | A * | 6/2000 | Du et al. | 710/200 |
| 6,226,649 | B1 * | 5/2001 | Bodamer et al. | 707/104.1 |
| 7,065,526 | B2 * | 6/2006 | Wissner et al. | 707/10 |
| 7,155,720 | B2 * | 12/2006 | Casati et al. | 718/104 |
| 2001/0027463 | A1 * | 10/2001 | Kobayashi | 718/103 |
| 2001/0032108 | A1 * | 10/2001 | Sieron et al. | 705/7 |
| 2003/0055834 | A1 * | 3/2003 | Hansen et al. | 707/101 |
| 2003/0065669 | A1 * | 4/2003 | Kahn et al. | 707/100 |
| 2003/0101086 | A1 * | 5/2003 | San Miguel | 705/9 |
| 2005/0137925 | A1 * | 6/2005 | Lakritz et al. | 705/8 |

OTHER PUBLICATIONS

Soren Peter Nielson, Carol Easthope, Pieter Gosselink, Karl Gutsze, Joanno Roele; Using Domino Workflow; May 2000; IBM Redbooks.*

* cited by examiner

*Primary Examiner*—Meng-Ai An
*Assistant Examiner*—Abdullah Al Kawsar
(74) *Attorney, Agent, or Firm*—Phuong-Quan Hoang; Robert P. Marley; Charles A. Johnson

(57) ABSTRACT

An embodiment of the present invention is a technique to manage tasks in a database system. Task information is sent to a host database program. The task information includes at least a command to perform a task requested by a user. The task information is parsed by the host database program. A library central to the host database program is invoked in response to the parsed task information. The library includes at least functions for task scheduling and task monitoring across sessions. The task is managed using the library. A task result is returned to the user.

14 Claims, 6 Drawing Sheets

GLOBAL MANAGEMENT OF JOBS IN A HETEROGENEOUS SYSTEM

RELATED APPLICATIONS

This application is related to the following patent applications: Ser. No. 10/736,175 entitled "MANAGING AND MAINTAINING MULTIPLE SERVER CONNECTIONS BY A SINGLE CLIENT SESSION"; Ser. No. 10/736,174 entitled "DATA RETRIEVAL AND ENTRY IN DATABASE SYSTEMS USING PRE-FILL STRUCTURES"; Ser. No. 10/736,173 entitled "SCHEDULING AND MONITORING TASKS IN A HETEROGENEOUS SYSTEM"; all filed on the same date and assigned to the same assignee as the present application, the contents of each of which are herein incorporated by reference.

BACKGROUND

1. Field of the Invention

Embodiments of the invention relate to the field of database, and more specifically, to job management.

2. Description of Related Art

Database systems have become increasingly popular. A typical database system has a database management system to manage the database. A database management system may perform a variety of tasks such as facilitating building database structures, monitoring and optimizing database performance, checking database integrity, preventing unauthorized database access, tracking database changes, etc.

A multi-user database system involves multiple users or applications to access the database. These multiple users or applications connect to the database in separate and independent sessions. In a collaborative environment, independent database sessions are not desirable. Existing techniques typically manage the user tasks by a graphics user interface (GUI) program that sends the user commands to execute a task to a host program. The host program executes the task directly and reports the results to the GUI. The state of a user connected to a database is known during the connection time. When there is a loss in communication, the tasks being performed may produce unknown results. Other collaborative users or applications may not know state or information on these tasks.

SUMMARY OF THE INVENTION

An embodiment of the present invention is a technique to manage tasks in a database system. Task information is sent to a host database program. The task information includes at least a command to perform a task requested by a user. The task information is parsed by the host database program. A library central to the host database program is invoked in response to the parsed task information. The library includes at least functions for task scheduling and task monitoring across sessions. The task is managed using the library. A task result is returned to the user.

BRIEF DESCRIPTION OF THE DRAWINGS

The invention may best be understood by referring to the following description and accompanying drawings that are used to illustrate embodiments of the invention. In the drawings.

DESCRIPTION

Figure 1:
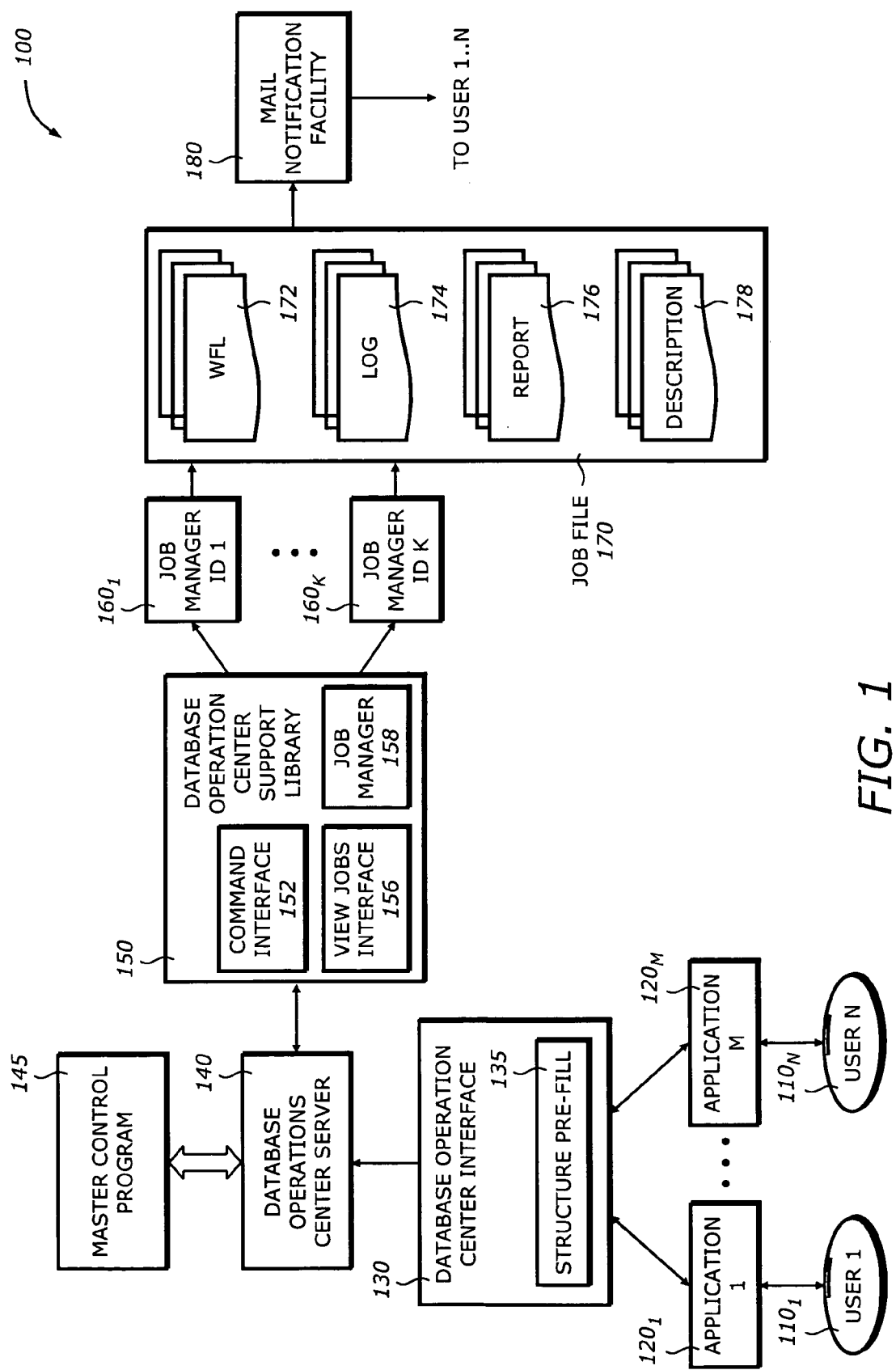
FIG. 1 is a diagram illustrating a database system architecture in which one embodiment of the invention can be practiced.

An embodiment of the present invention is a technique to manage tasks in a database system. Task information is sent to a host database program. The task information includes at least a command to perform a task requested by a user. The task information is parsed by the host database program. A library central to the host database program is invoked in response to the parsed task information. The library includes at least functions for task scheduling and task monitoring across sessions. The task is managed using the library. A task result is returned to the user.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, firmware, software or any combination thereof. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. A process may represent a loop structure by one iteration.

FIG. 1 is a diagram illustrating a database system architecture 100 in which one embodiment of the invention can be practiced. The database system architecture 100 includes N users $110_1$ to $110_N$, M applications $120_1$ to $120_M$, a database operation center (DOC) interface 130, a database center server 140, a master control program (MCP) 145, a DOC support library 150, K job managers $160_1$ to $160_K$, a job file 170, and a mail notification facility 180.

The N users $110_1$ to $110_N$ are users of the database system. Typically the users $110_1$ to $110_N$ are collaborators or part of a team. They may log on the system at various times and may be located remotely from one another. Each user may have a unique user identifier and a particular level of access privilege or security. The K applications $120_1$ to $120_M$ are applications, sessions, or programs launched by the users. A user may launch more than one application. Each application may correspond to a task, multiple tasks, or a job that may have access to the database center server 140. The applications $120_1$ to $120_M$ represent a heterogeneous system having different types of applications or sessions.

The DOC interface 130 provides an interface between the applications $120_1$ to $120_M$ and the database center server 140. The DOC interface 130 provides a GUI to the user to receive user input. The database center server 140 contains a host database program that provides basic database management facilities such as utility, copy/audit, recovery, error handling, database creation, monitoring and tuning, etc. The master control program (MCP) 145 is the operating system of the server that performs basic task or job operations such as execute a task, terminate a task, etc.

The DOC support library 150 provides basic functions or utilities to provide entry points to the database center server to aid scheduling and monitoring functions. The DOC support library 150 is central to the host database program and may serve many database center server programs at the same time. This allows a central view to all the jobs that execute concurrently on the host, thus allowing access to job-related information from different DOC sessions. The DOC support library 150 includes a command interface 152, a view jobs interface 156, and a job manager 158. The command interface 152 receives requests or commands from the database center server 140 to accomplish various functions. The view jobs interface 156 provides facility to view job files such as log file, report file, etc. The job manager 158 organizes job scheduling, monitors jobs and manages tasks in an asynchronous manner. Examples of functions of the job manager 158 includes starting a task, logging task-related information, generating reports, interfacing to the mail notification facility 180, and responding to job specific messages from the DOC interface 130. The DOC support library 150 provides capabilities for global management of tasks or jobs in a heterogeneous system. This is possible because the DOC support library 150 provides central management across multiple sessions and asynchronous task execution.

The K job manager (JM) identifiers $160_1$ to $160_K$ correspond to K jobs being executed or during execution. The job file 170 contains files specific to a job or task. The job file 170 includes work flow language (WFL) files 172, log files 174, report files 176, and description files 178. The WFL files include files that are used for constructing jobs that compile or run programs. WFL is a true programming language with its own compiler that either produces an object code file used in running a job or executes a job interpretively. The log files 174 include files that log job activities with time stamps. The report files 176 include files that contain report of a job such as success status, task result. The description files 178 include files that contain machine-readable layout of every aspect of a database managed by the database center server 140.

The mail notification facility 180 includes facility or interface to send notifications to users $110_1$ to $110_N$ such as e-mails with attachment to the job file 170 corresponding to a task or job.

Figure 2:
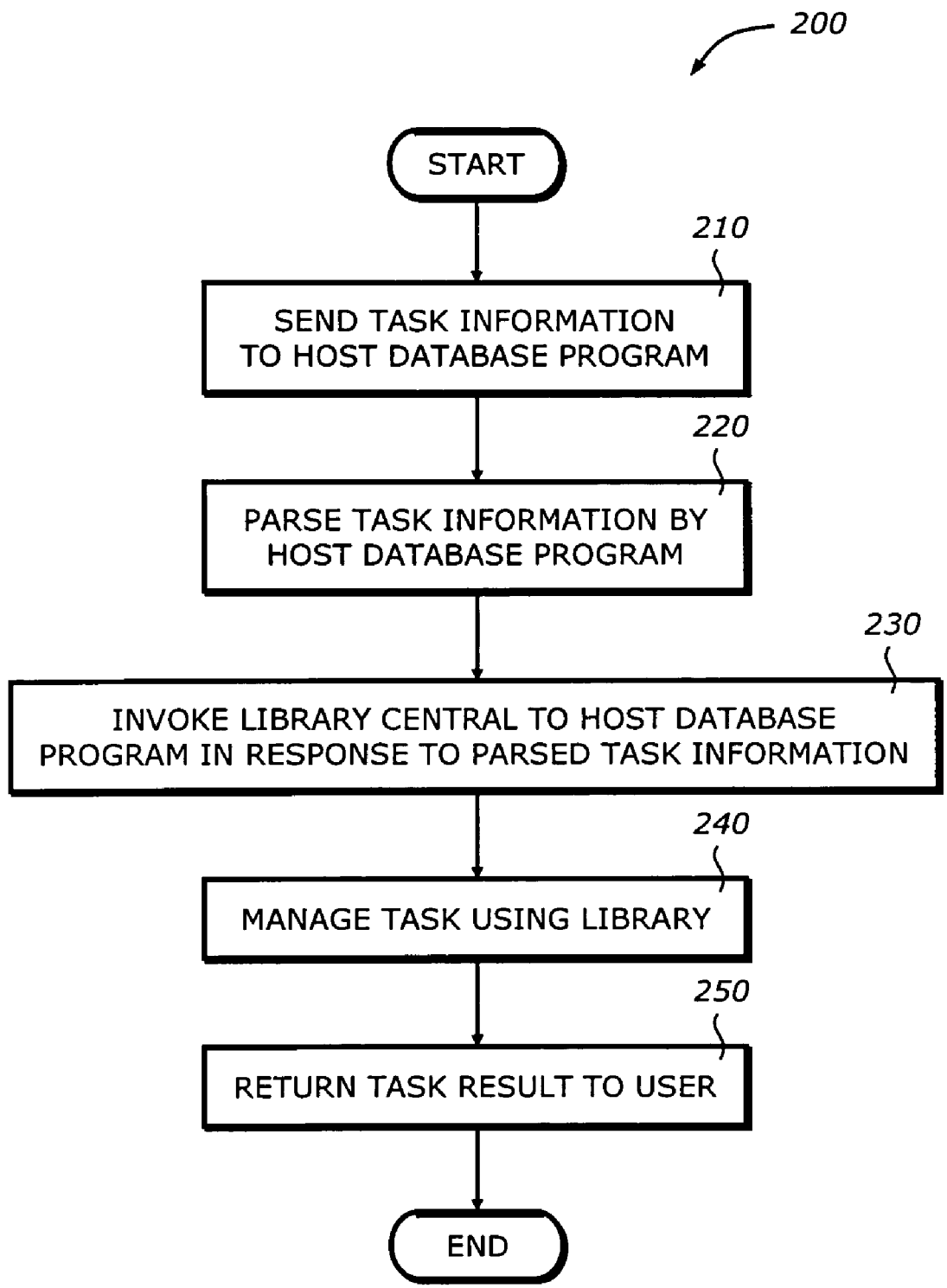
FIG. 2 is a flowchart illustrating a process to manage jobs according to one embodiment of the invention.

FIG. 2 is a flowchart illustrating a process to manage jobs 200 according to one embodiment of the invention.

Upon START, the process 200 sends task or job information to the host database program (Block 210). The host database program resides in the database center server. Then, the process 200 parses the task information by the host database program (Block 220). Next, the process 200 invokes the library central to the host database program in response to the parsed task information (Block 230). The library is the DOC support library 150 shown in FIG. 1. It includes at least functions for task scheduling and task monitoring across sessions. Then, the process 200 manages the task using the library (Block 240). This includes the use of the command interface 152, the view job interface 156, and the job manager 158 shown in FIG. 1. Next, the process 200 returns a task result to the user (Block 250). The task result may be an e-mail message with or without an attachment sent by the mail notification facility 180 shown in FIG. 1. The attachment may be a log file, a report file, or any other file. Then, the process 200 is terminated.

Figure 3:
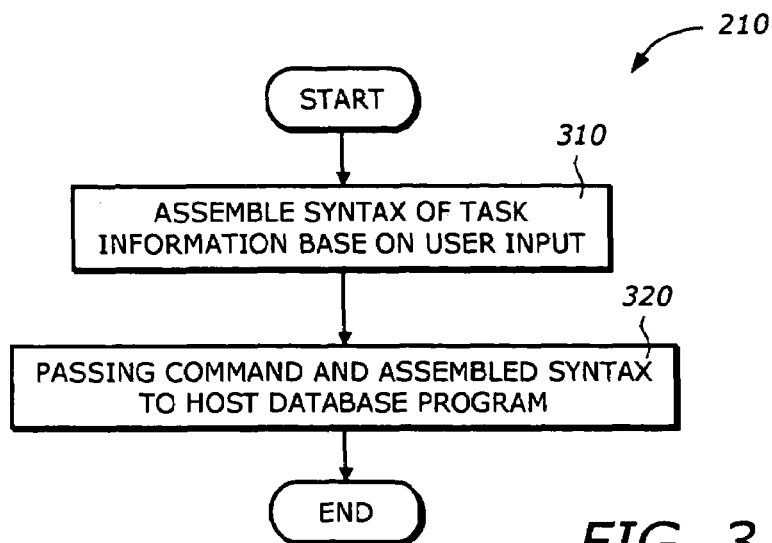
FIG. 3 is a flowchart illustrating a process to send task information according to one embodiment of the invention.

FIG. 3 is a flowchart illustrating a process 210 to send task information according to one embodiment of the invention.

Upon START, the process 210 assembles the syntax of the task information based on the user input (Block 310). This includes formatting the task information into format that can be interpreted or parsed by the database center server 140 (FIG. 1). Next, the process 210 passes the command and the assembled syntax to the host database program (Block 320) and is then terminated.

Figure 4:
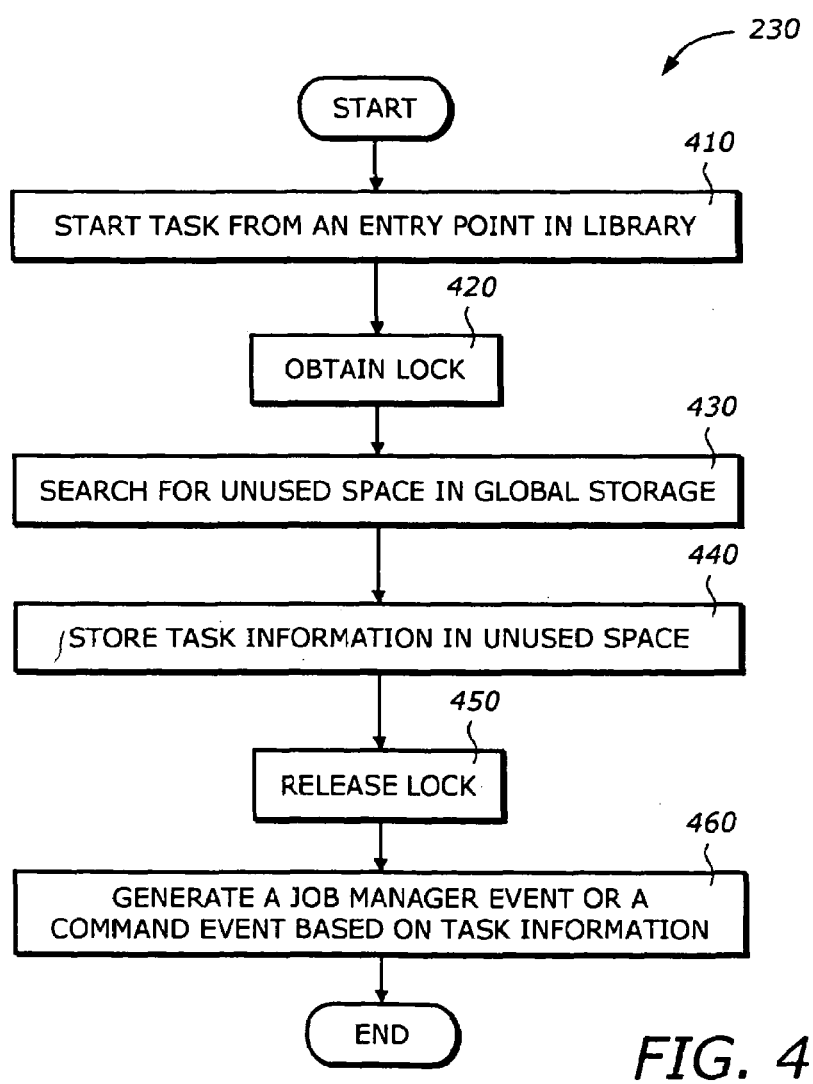
FIG. 4 is a flowchart illustrating a process to invoke library according to one embodiment of the invention.

FIG. 4 is a flowchart illustrating a process 230 to invoke library according to one embodiment of the invention.

Upon START, the process 230 starts the task from an entry point in the library (Block 410). Next, the process 230 obtains a lock (Block 420) to ensure that the subsequent operations are not interfered. If a lock cannot be obtained indicating that another process may be using it, the process 230 waits and continues trying to obtain the lock. Then, the process 230 searches for an unused space or slot in a global storage or array (Block 430). The global storage is accessible to all jobs or tasks in the system. Typically, the global storage has sufficient capacity to accommodate all the job- or task-related information. Next, the process 230 stores the task information in the unused storage (Block 440) for later retrieval. Then, the process 230 releases the lock (Block 450) so that accesses to the global storage can be made for other jobs or tasks.

Next, the process 230 generates a job manger event or a command event based on the task information (Block 460). The command event may be a key-in command, a terminate command, or a get packs command. The process 230 is then terminated.

Figure 5:
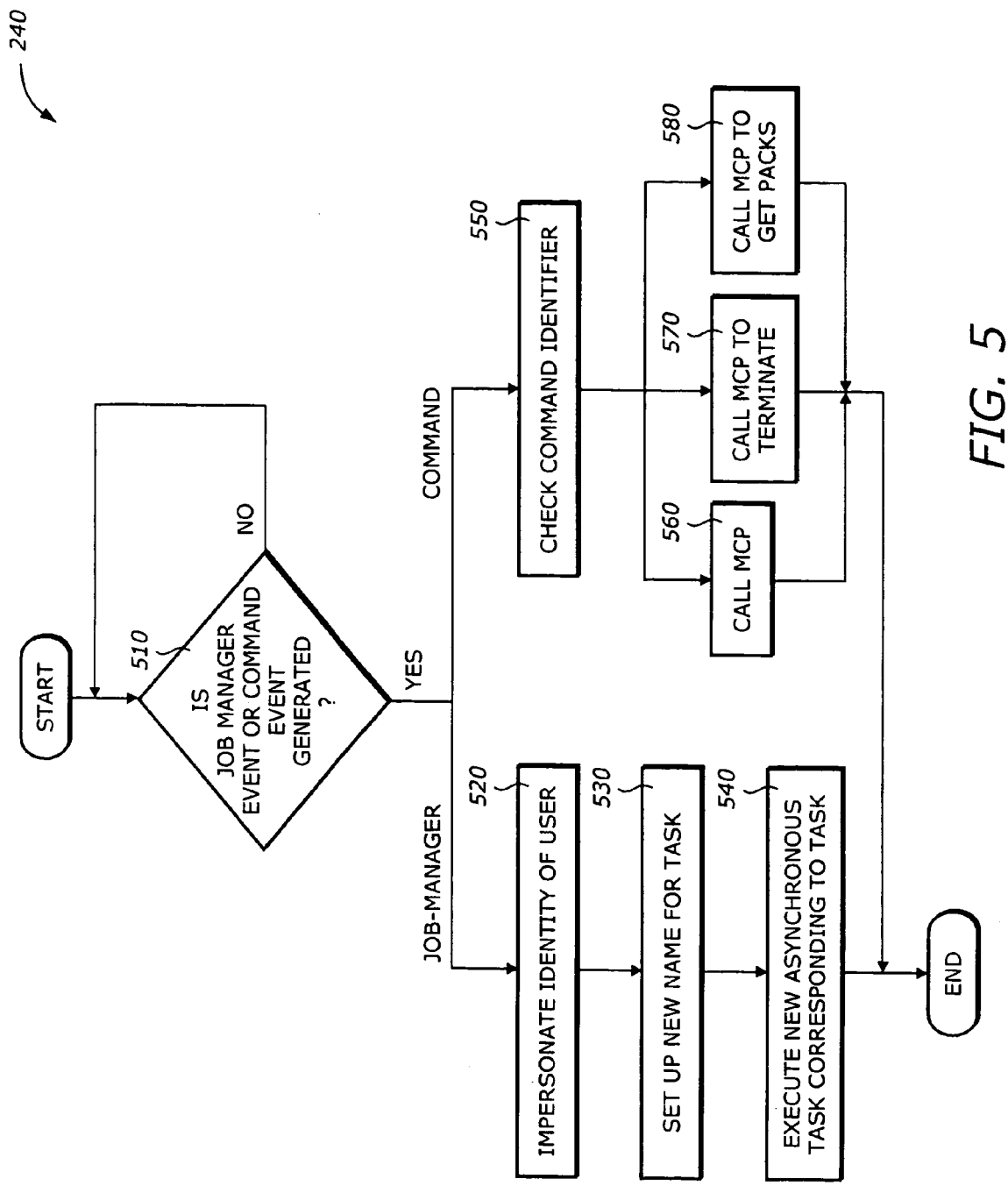
FIG. 5 is a flowchart illustrating a process to manage tasks according to one embodiment of the invention.

FIG. 5 is a flowchart illustrating a process 240 to manage tasks according to one embodiment of the invention. The process 240 may include one iteration or a loop structure with multiple iterations. The flowchart shows one iteration whether it represents the entire process or one iteration in a continuous loop.

Upon START, the process 240 determines if a job manager event or a command event is generated (Block 510). If not, the process 240 returns to Block 510 waiting for the event to be generated. Otherwise, the process 240 proceeds to respond to the event. If it is a job manager event, the process 240 impersonates an identity of the user (Block 520). Then, the process 240 sets up a new name for the task (Block 530). Next, the process 240 executes a new asynchronous task corresponding to the task (Block 540) and is then terminated.

If the event is a command event, the process 240 checks the command identifier (Block 550) to determine what type of command. If it is a key-in command, the process 240 calls the master control program (MCP) to perform the requested operation (Block 560) and is then terminated. If it is a terminate command, the process 240 calls the MCP to terminate (Block 570) and is then terminated. If it is a get pack command, the process 240 calls the MCP to get packs (Block 580) and is then terminated. The get pack command is to obtain a list of all valid families of databases used in the system.

Figure 6:
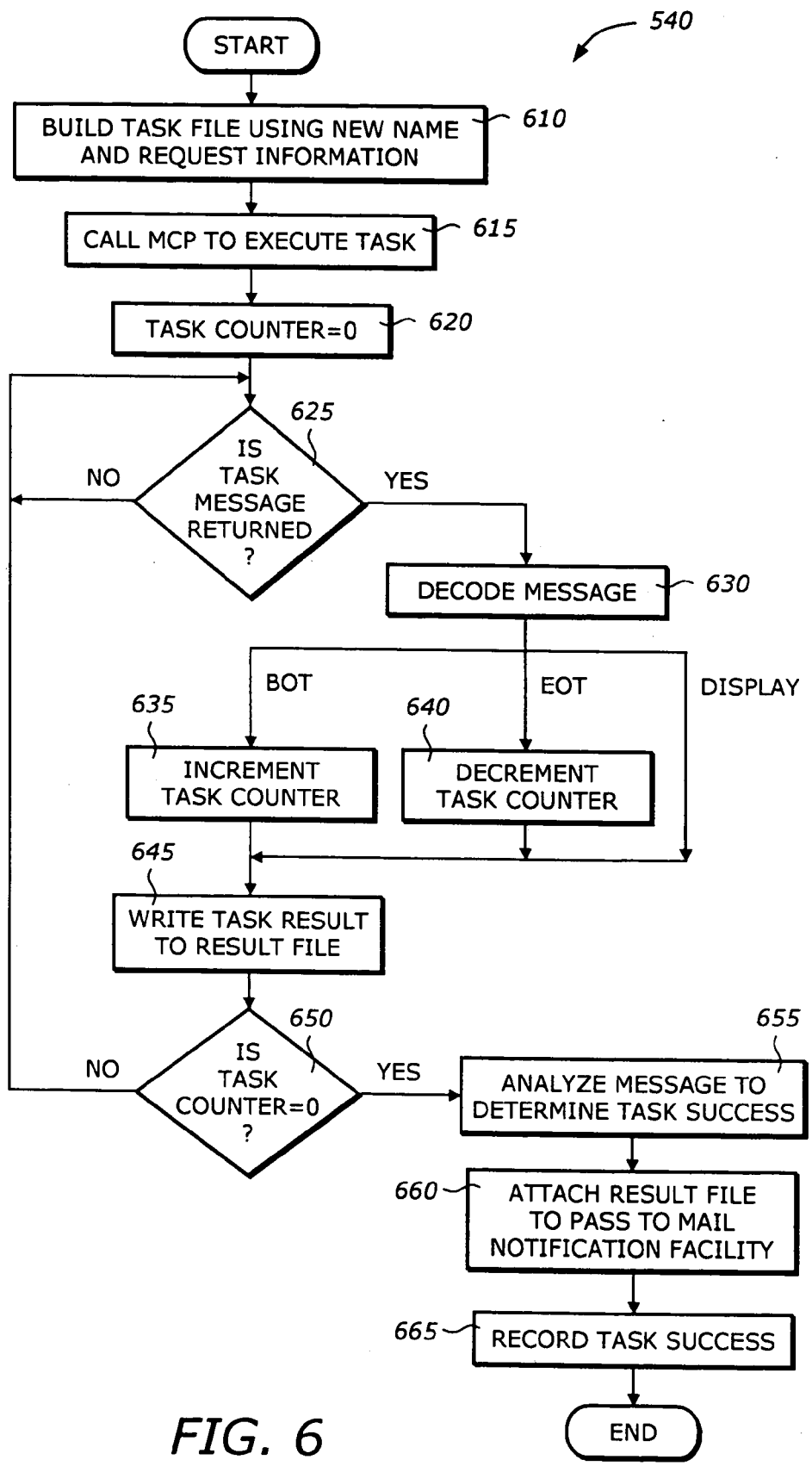
FIG. 6 is a flowchart illustrating a process to execute an asynchronous task according to one embodiment of the invention.

FIG. 6 is a flowchart illustrating a process 540 to execute an asynchronous task according to one embodiment of the invention.

Upon START, the process 540 builds a task file using the new name and the request information (Block 610). Then, the process 540 calls the MCP to execute the task (Block 615). Next, the process 540 initializes a test counter to zero (Block 620). Then, the process 540 determines if a task message is returned (Block 625). If not, the process 540 returns to block 625 to wait for the return of the task message. It is noted that this can be done by an interrupt mechanism so that the process 540 does not have to continuously loop back to check for the return of the message. If a task message is returned, the process 540 decodes the message (Block 630).

If it is a beginning of task (BOT) message, the process 540 increments the task counter (Block 635) and then write the task result to a result file corresponding to the task (Block 645). The result file may be a log file, a report file, or any other relevant file. If the message is an end of task (EOT) message, the process 540 decrements the task counter (Block 640) and then proceeds to Block 645. If the message is a display message, the process 540 proceeds to Block 645.

Then, the process 540 determines if the task counter is equal to zero (Block 650) indicating all asynchronous tasks have been executed. If not, the process 540 returns to Block 625 to wait for the return of a task message. Otherwise, the process 540 analyzes the message to determine the task success (Block 655). Then, the process 540 attaches the result file to the mail notification facility to send to the user (Block 660). Next, the process 540 records the task success (Block 665) and is then terminated.

Figure 7:
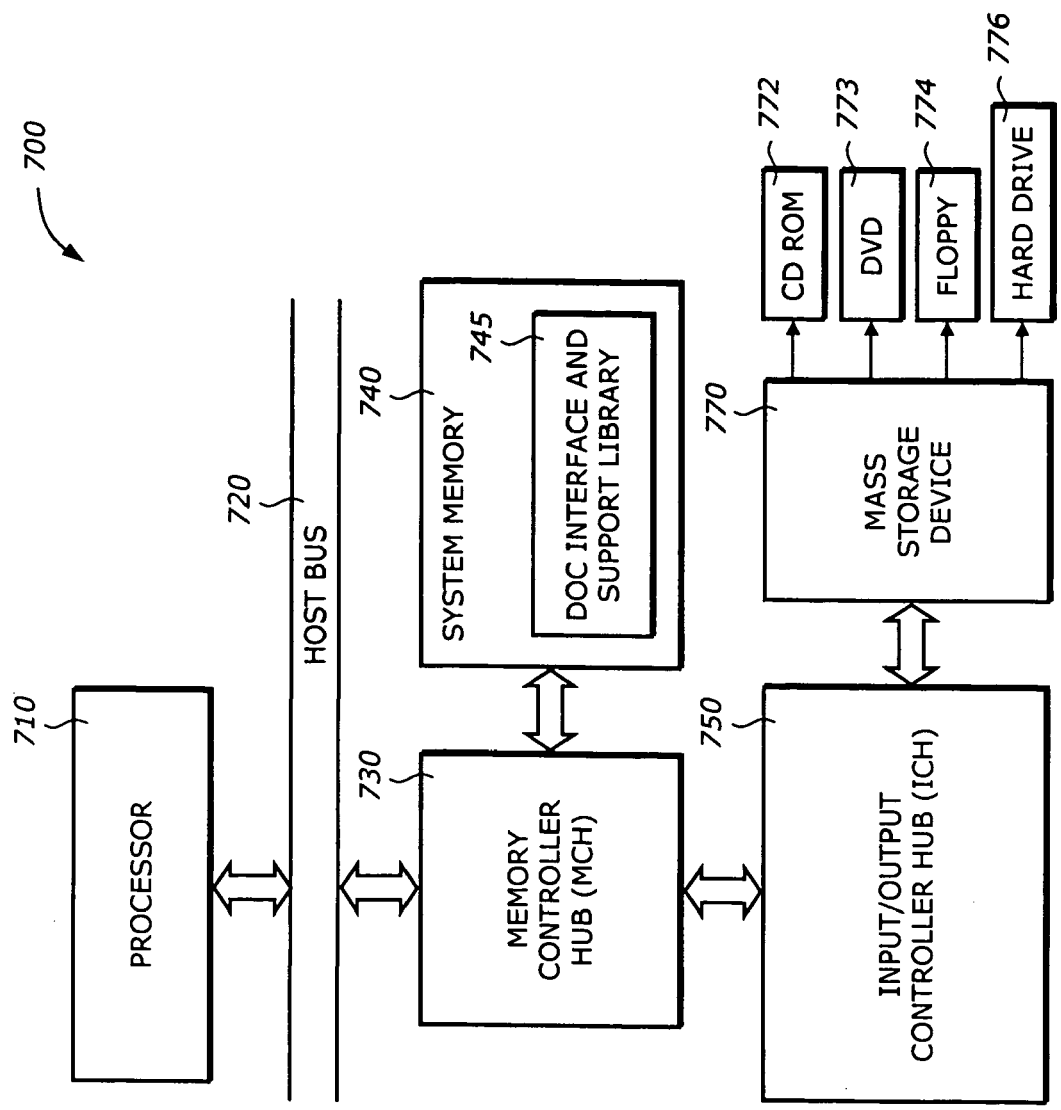
FIG. 7 is a diagram illustrating a computer system according to one embodiment of the invention.

FIG. 7 is a diagram illustrating a computer system 700 in which one embodiment of the invention can be practiced. The system 700 includes a processor 710, a processor bus 720, a memory control hub (MCH) 730, a system memory 740, an input/output control hub (ICH) 750, and a mass storage device 770. Note that the system 700 may include more or less elements than these elements.

The processor 710 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 720 provides interface signals to allow the processor 710 to communicate with other processors or devices, e.g., the MCH 730. The host bus 720 may support a uni-processor or multiprocessor configuration. The host bus 720 may be parallel, sequential, pipelined, asynchronous, synchronous, or any combination thereof.

The MCH 730 provides control and configuration of memory and input/output devices such as the system memory 740 and the ICH 750. The MCH 730 may be integrated into a chipset that integrates multiple functionalities such as the isolated execution mode, host-to-peripheral bus interface, memory control.

The system memory 740 stores system code and data. The system memory 740 is typically implemented with dynamic random access memory (DRAM) or static random access memory (SRAM). The system memory may include program code or code segments implementing one embodiment of the invention. The system memory includes a database operation center interface and support library 745. Any one of the elements of the database operation center interface and support library 745 may be implemented by hardware, software, firmware, microcode, or any combination thereof. The system memory 740 may also include other programs or data which are not shown, such as an operating system. The database operation center interface and support library 745 may implement all or part of the database management functions. The database operation center interface and support library 745 may also simulate the database management functions. The database operation center interface and support library 745 contains instructions that, when executed by the processor 710, causes the processor to perform the tasks or operations as described as above.

The ICH 750 has a number of functionalities that are designed to support I/O functions. The ICH 750 may also be integrated into a chipset together or separate from the MCH 730 to perform I/O functions. The mass storage device 770 stores archive information such as code, programs, files, data, databases, applications, and operating systems. The mass storage device 770 may include compact disk (CD) ROM 772, a digital video/versatile disc (DVD) 773, floppy drive 774, and hard drive 776, and any other magnetic or optic storage devices such as tape drive, tape library, redundant arrays of inexpensive disks (RAIDs), etc. The mass storage device 770 provides a mechanism to read machine-accessible media. The machine-accessible media may contain computer readable program code to perform tasks as described above.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   sending task information to a host database program, the task information including at least a command to perform a task requested by a user;
   parsing the task information by the host database program;
   invoking a library central to the host database program in response to the parsed task information, the library including at least functions for task scheduling and task monitoring across sessions;
   managing the task using the library; and
   returning a task result to the user;
   wherein invoking the library comprises:
   starting the task from an entry point in the library;
   obtaining a lock;
   searching or an unused space in a global storage;
   storing the task information in the unused space;
   releasing the lock; and
   generating one of a job manager event and a command event.

2. The method of claim 1 wherein sending the task information comprises:
   assembling syntax of the task information based on user input;
   passing the command and the assembled syntax to the host database program.

3. The method of claim 1 wherein managing the task comprises:
   responding to one of the job manager event and the command event, the command event including a key-in command, a terminate command, and a get pack command.

4. The method of claim 3 wherein responding to the job manager event comprises:
   impersonating an identity of the user;
   setting up a new name for the task; and
   executing a new asynchronous task corresponding to the task.

5. The method of claim 4 wherein executing the new asynchronous task comprises:
   building a task file using the new name and the request information;
   calling a master control program to execute the task; and
   responding to a message returned by the task, the message being one of a task beginning, a task end, and a display request.

6. The method of claim 1 wherein responding to the message comprises:
   increment a task counter if the message is the task beginning;
   decrement the task counter if the message is a task end;
   processing task result if the task counter is zero; and
   write task result to a result file.

7. The method of claim 6 wherein processing the task result comprises:
   analyzing the message to determine task success;
   attaching the result file to pass to a mail notification facility; and
   recording the task success.

8. The method of claim 3 wherein responding the command event comprises:
   calling a master control program if the command event is the key-in command;
   calling a terminate function in the master control program if the command event is a terminate command; and
   calling a get pack function in the master control program if the command event is a get pack command.

9. An article of manufacture comprising:
   a machine-accessible storage medium including data that, when accessed by a machine, causes the machine to perform operations comprising:
   sending task information to a host database program, the task information including at least a command to perform a task requested by a user;
   parsing the task information by the host database program;
   invoking a library central to the host database program in response to the parsed task information, the library including at least functions for task scheduling and task monitoring across sessions;
   managing the task using the library; and
   returning a task result to the user;
   wherein the data causing the machine to perform invoking the library comprises data that, when accessed by the machine, causes the machine to perform operations comprising:
   starting the task from an entry point in the library;
   obtaining a lock;
   searching for an unused space in a global storage;
   storing the task information in the unused space;
   releasing the lock; and
   generating one of a job manager event and a command event.

10. The article of manufacture of claim 9 wherein the data causing the machine to perform managing the task comprises data that, when accessed by the machine, causes the machine to perform operations comprising:
    responding to one of the job manager event and the command event, the command event including a key-in command, a terminate command, and a get pack command.

11. The article of manufacture of claim 10 wherein the data causing the machine to perform responding to the job manager event comprises data that, when accessed by the machine, causes the machine to perform operations comprising:
    impersonating an identity of the user;
    setting up a new name for the task; and
    executing a new asynchronous task corresponding to the task.

12. A system comprising:
    a processor; and
    a memory coupled to the processor, the memory containing instructions that, when executed by the processor, cause the processor to:
    send task information to a host database program, the task information including
    at least a command to perform a task requested by a user,
    parse the task information by the host database program,
    invoke a library central to the host database program in response the parsed task information, the library including at least functions for task scheduling and task monitoring across sessions,
    manage the task using the library, and
    return a task result to the user;
    wherein the instructions causing the processor to invoke the library comprises instructions that, when executed by the processor, cause the processor to:

start the task from an entry point in the library;
obtain a lock;
search for an unused space in a global storage;
store the task information in the unused space;
release the lock; and
generate one of a job manager event and a command event.

13. The system of claim 12 wherein the instructions causing the processor to manage the task comprises instructions that, when executed by the processor, cause the processor to:

respond to one of the job manager event and the command event, the command event including a key-in command, a terminate command, and a get pack command.

14. The system of claim 13 wherein the instructions causing the processor to respond to the job manager event comprises instructions that, when executed by the processor, cause the processor to:

impersonating an identity of the user;

setting up a new name for the task; and executing a new asynchronous task corresponding to the task.

* * * * *